United States Patent [19]

Kinoshita

[11] Patent Number: 4,866,597
[45] Date of Patent: Sep. 12, 1989

[54] MULTIPROCESSOR SYSTEM AND CONTROL METHOD THEREFOR

[75] Inventor: Kiyoshi Kinoshita, Kokubunji, Japan

[73] Assignee: Kabushiki Kaisha Toshiba, Kawasaki, Japan

[21] Appl. No.: 727,828

[22] Filed: Apr. 26, 1985

[30] Foreign Application Priority Data

Apr. 26, 1984 [JP] Japan .................................. 59-85008

[51] Int. Cl.⁴ ............................................. G06F 13/14
[52] U.S. Cl. .................................. 364/200; 364/228.3; 364/242.3; 364/232.9
[58] Field of Search ... 364/200 MS File, 900 MS File

[56] References Cited

U.S. PATENT DOCUMENTS

| | | | |
|---|---|---|---|
| 4,115,854 | 9/1978 | Capowski et al. | 364/200 |
| 4,258,418 | 3/1981 | Heath | 364/200 |
| 4,355,354 | 10/1982 | Kempf et al. | 364/200 |
| 4,371,932 | 2/1983 | Dinwiddie, Jr. et al. | 364/200 |
| 4,513,370 | 4/1985 | Ziv et al. | 364/200 |
| 4,590,556 | 5/1986 | Berger et al. | 364/200 |
| 4,648,029 | 3/1987 | Cooper et al. | 364/200 |

FOREIGN PATENT DOCUMENTS 56-110169 9/1981 Japan .
57-50037 3/1982 Japan .

*Primary Examiner*—Eddie P. Chan
*Assistant Examiner*—Debra A. Chun
*Attorney, Agent, or Firm*—Foley & Lardner, Schwartz, Jeffery, Schwaab, Mack, Blumenthal & Evans

[57] ABSTRACT

A multiprocessor system is configured so as to effect a bidirectional data transfer among a plurality of processors through a data buffer of a plurality of bytes to which transfer data can be written and from which it can be read. The system is provided with mode storage means of which contents are rewritten by at least one of the plurality of processors and for storing mode information indicating that write/read operation of transfer data in the data buffer means by the one processor is controlled based on DMA system or interrupt system, condition storage means for storing information as to whether write and read operations of transfer data in the data buffer means by the one processor are in an allowed condition or not, and selector means operative to output either a DMA request signal or an interrupt request signal on the basis of storage contents of the mode storage means and the condition storage means, and a DMA controller wherein when the DMA request signal is given, the DMA controller is operative to control write/read operation of transfer data in the data buffer means by the one processor based on the DMA system, whereby when the interrupt request signal is given, the one processor is operative to control write/-read operation of transfer data in the data buffer means based on the interrupt system.

5 Claims, 10 Drawing Sheets

MULTIPROCESSOR SYSTEM AND CONTROL METHOD THEREFOR

BACKGROUND OF THE INVENTION

The present invention relates to a multiprocessor system comprising a plurality of processors, and more particularly to data transfer between a plurality of microprocessors.

Hitherto, for transferring data between a plurality of microprocessors, there have been proposed a system called "input/output (I/O) connection system", a system using a FIFO (First-In First-Out) controller, or a system using a shared memory, etc.

The first system called "I/O connection system", e.g., comprises first and second processors, a parallel I/O controller (PIO) for controlling input of data to the first processor and/or output of data therefrom, and another parallel I/O adapter (PIA) for controlling input of data to the second processor and/or output of data therefrom. The first processor and the PIO are connected by means of a bus, the PIO and the PIA are connected by means of a data line, and the second processor and the PIA are connected by means of a bus. Transfer data from the first processor is fed to the PIO through the bus. Then, the transfer data fed to the PIA from the PIO through the data line is fed to the second processor through the bus. Likewise, transfer data from the second processor is fed to the PIA through the bus. Then, the transfer data fed to the PIO from the PIA through the data line is fed to the first processor through the bus. With the system, mutual data transfer between the first and second processors can be performed. However, the drawback with this system is that only one byte of data can be transferred at a time so that the transfer efficiency is low.

Further, the second system using a FIFO controller is disclosed in, e.g., Japanese Patent Laid-open Publication No. 110169/1981 wherein data transfer between first and second processors is performed via a data line and the FIFO controller. The system can perform mutual data transfer between processors, but has drawbacks that the whole system becomes costly because the FIFO controller is expensive and the FIFO controller has a limited number of processors connectable thereto.

Furthermore, the third system using a shared memory is disclosed in, e.g., Japanese Patent Laid-open Publication No. 50037/1982 wherein data transfer between first and second processors is performed in a manner that one processor writes the transfer data into the shared memory through an access controller and the other processor reads it from the shared memory through the access controller. The system can perform mutual data transfer between processors, but has drawbacks that the both processors cannot access the shared memory at the same time and the access controller becomes structurally complicated.

SUMMARY OF THE INVENTION

A first object of the present invention is to realize a simplified and inexpensive multiprocessor system in which a plurality of microprocessors, particularly those having internal architecture different from each other are connected.

A second object of the present invention is to make it possible to effect bidirectional data transfer between microprocessors and to increase the transfer efficiency.

A third object of the present invention is to effect data transfer at a high speed and to improve data transfer processing ability by controlling data transfer by DMA process thereby to eliminate interrupt processing by software.

A fourth object of the present invention is to switch by commands based on software whether data transfer should be controlled by DMA process or interrupt process, thereby providing adaptability not only to a large quantity of data transfer but also a small quantity thereof.

To achieve these objects, there is provided a multiprocessor system comprising a plurality of processors, at least one data buffer means into which data transferred among these processors can be written and from which it can be read, mode storage means whose contents are rewritten by one processor among the plurality of processors, the mode storage means storing mode information indicating that write and/or read operation of the transfer data in the data buffer means is controlled by DMA process or by interrupt process, condition storage means for storing information indicating that the data buffer means is in a condition permitting the one processor to read and/or write data, selector means operative to output either a DMA request signal or an interrupt request signal on the basis of contents of the mode storage means and the condition storage means, and at least one DMA controller operative to control write and/or read operation of the transfer data in or from the data buffer means by the one processor by the DMA process when a DMA request signal is given, whereby when an interrupt request signal is given, the one processor is operative to control write and/or read of the transfer data in the data buffer means by the interrupt process.

DETAILED DESCRIPTION OF THE EMBODIMENT

Figure 1:
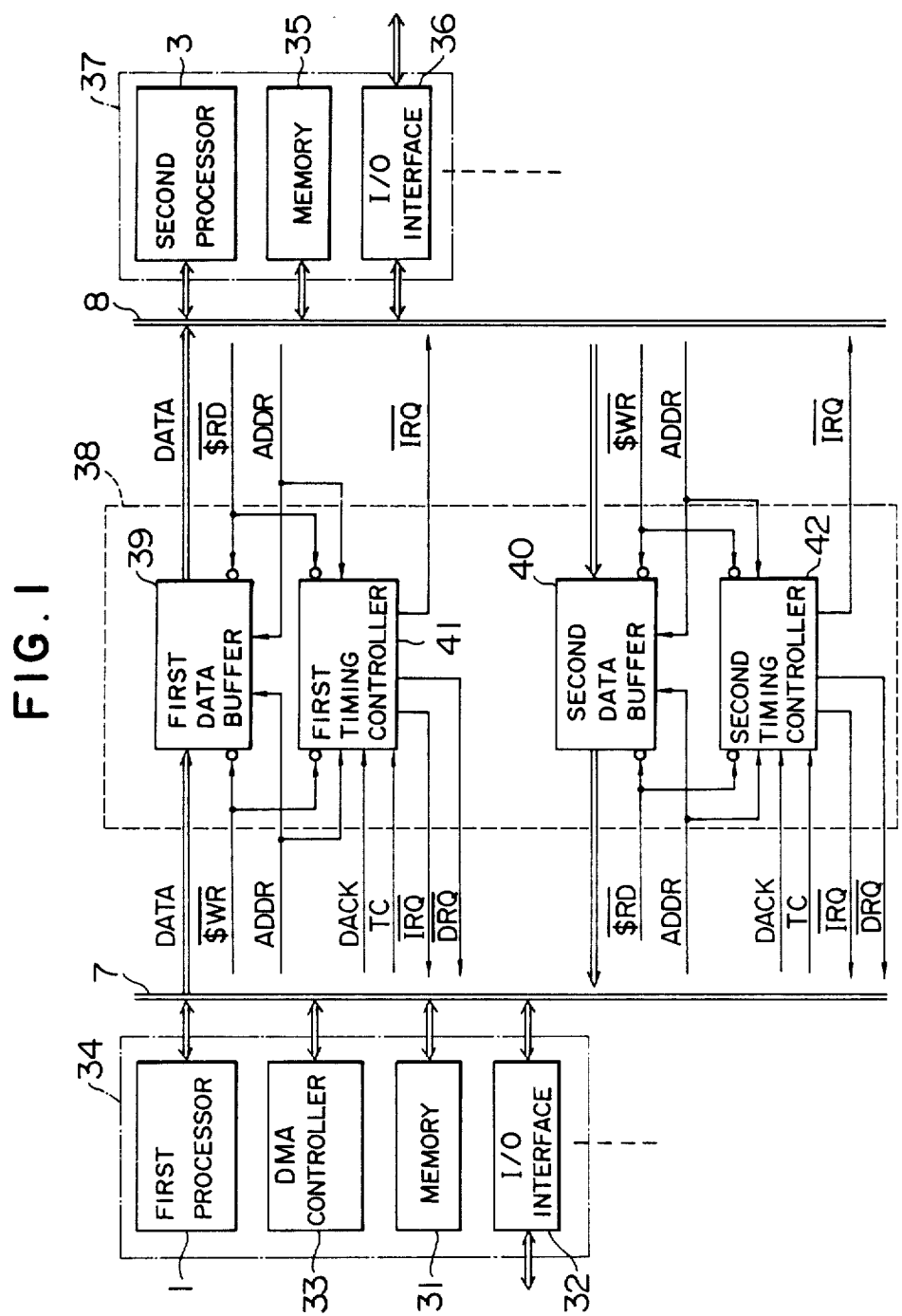
FIG. 1 is a block diagram illustrating an elementary configuration of a multiprocessor system according to the present invention.

As shown in FIG. 1, a multiprocessor system to which the present invention is applied comprises a first microprocessor system 34 comprising a first processor 1 having an internal architecture of 16 bits, a memory 31, an I/O interface 32 and a DMA controller 33, a second microprocessor system 37 comprising a second processor 3 having an internal architecture of 8 bits, a memory 35 and an I/O interface 36, and an inter processor communication circuit (which will be called an "IPC") 38 coupled between the first and second systems 34 and 37, thereby effecting data transmission therebetween. The IPC 38 comprises a first data buffer 39 for holding, 4 bits at a time, transfer data from the first system 34 to the second system 37, a second data buffer 40 for holding transfer data, 4 bits at a time, from the second system 34 to the first system 37, a first transfer timing controller 41 for controlling a transfer timing of data in the first data buffer 39, and a second transfer timing controller 42 for controlling a transfer timing of data in the second data buffer 40.

Figure 2:
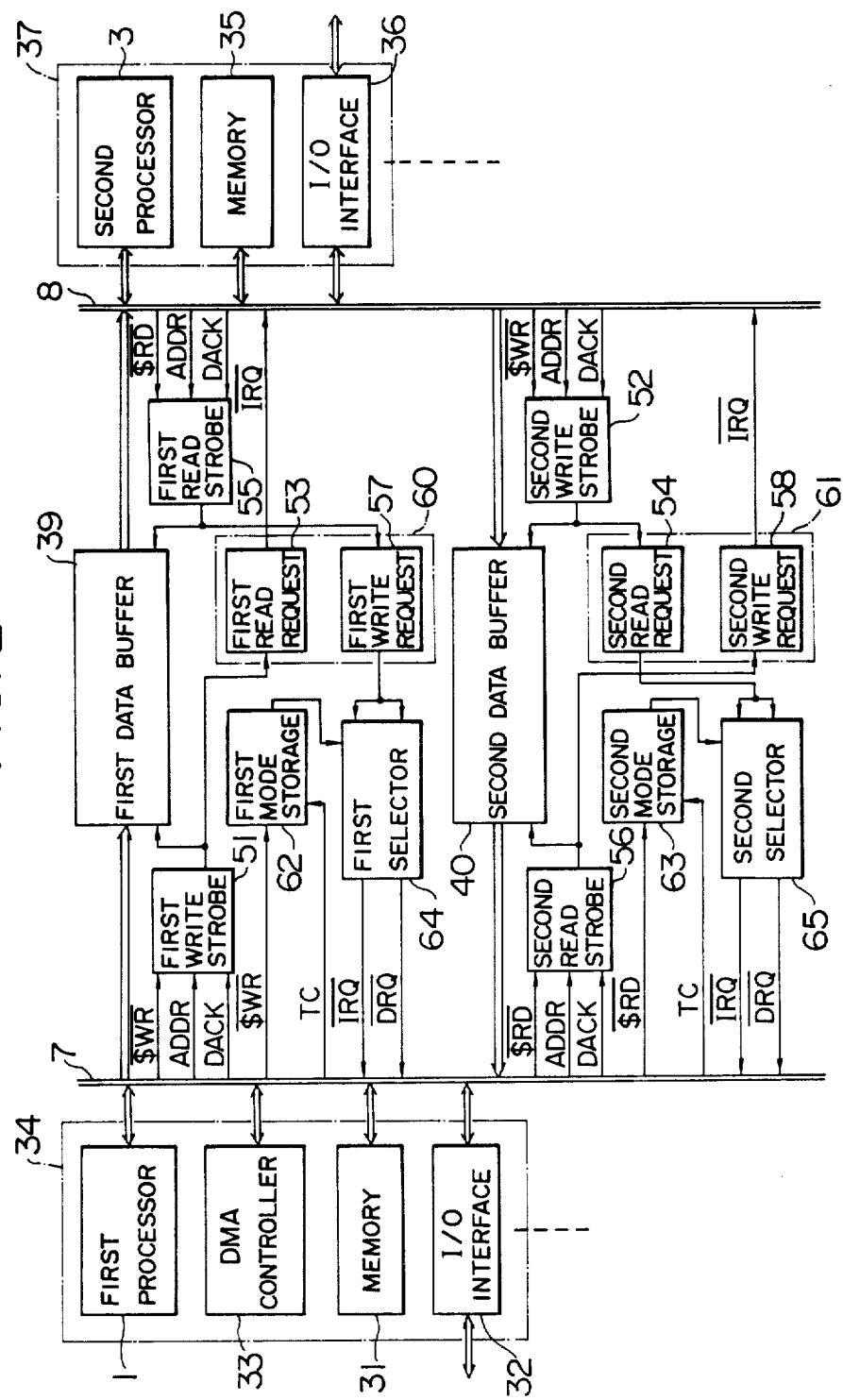
FIG. 2 is a block diagram illustrating the configuration of an embodiment according to the present invention.

FIG. 2 is a detailed circuit configuration of the IPC in the multiprocessor system shown in FIG. 1. First and second write strobe circuits 51 and 52 are provided for creating buffer write strobe signals in response to an address signal and a control signal, and deliver these write strobe signals to the first and second data buffers 39 and 40, respectively, and to first and second read request circuits 53 and 54, respectively. First and second read strobe circuits 55 and 56 are provided for producing buffer read strobe signals in response to an address signal and a control signal, and deliver these read strobe signals to the first and second data buffers 39 and 40, respectively, and to first and second write request circuits 57 and 58, respectively. The circuits 53 and 57 and the circuits 54 and 58 constitute, respectively, condition storage circuits 60 and 61 for storing information as to whether data transfer between the first and second processors 1 and 3, and the first and second data buffers 39 and 40 is in an allowed condition or not.

First and second mode storage circuits 62 and 63 are provided for judging mode information as to whether an interrupt control by processor is effected or a DMA control by a DMA controller is effected. For this purpose, they store the mode information therein in accordance with a read/write strobe signal and a terminal count (TC) signal, and feed select signals to first and second selectors 64 and 65. The first selector 64 is provided for selecting an output signal from the first write request circuit 57 in accordance with the select signal fed from the first mode storage circuit 62 to output an interrupt request signal $\overline{IRQ}$ or a DMA request signal $\overline{DRQ}$. The second selector 65 is provided for selecting an output signal from the second read request circuit 54 in accordance with the select signal fed from the second mode storage circuit 63 to output an interrupt request signal $\overline{IRQ}$ or a DMA request signal $\overline{DRQ}$.

Figure 3:
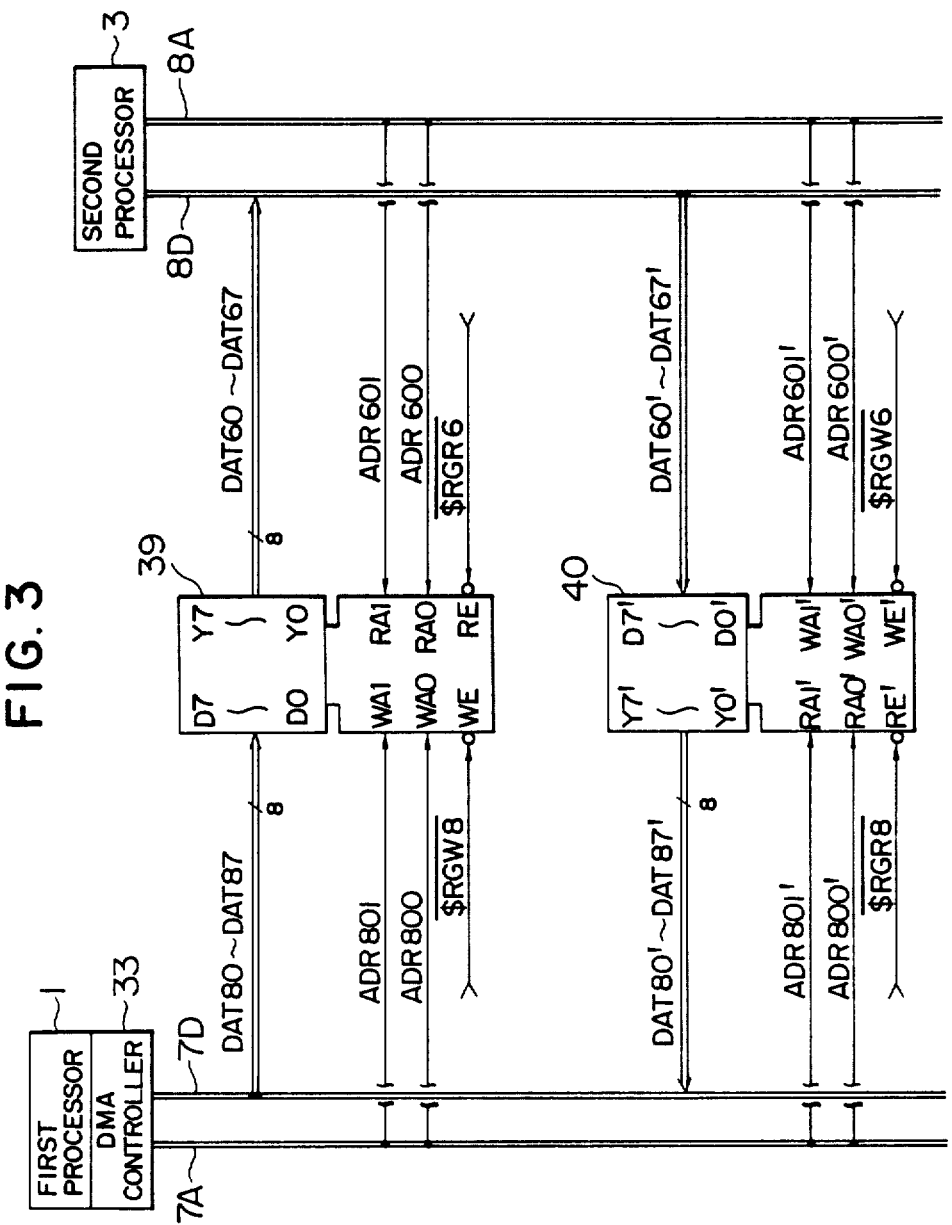
FIGS. 3 to 8 are circuits diagrams illustrating details of each part of the configuration in the embodiment shown in FIG. 2, respectively.
Figure 4:
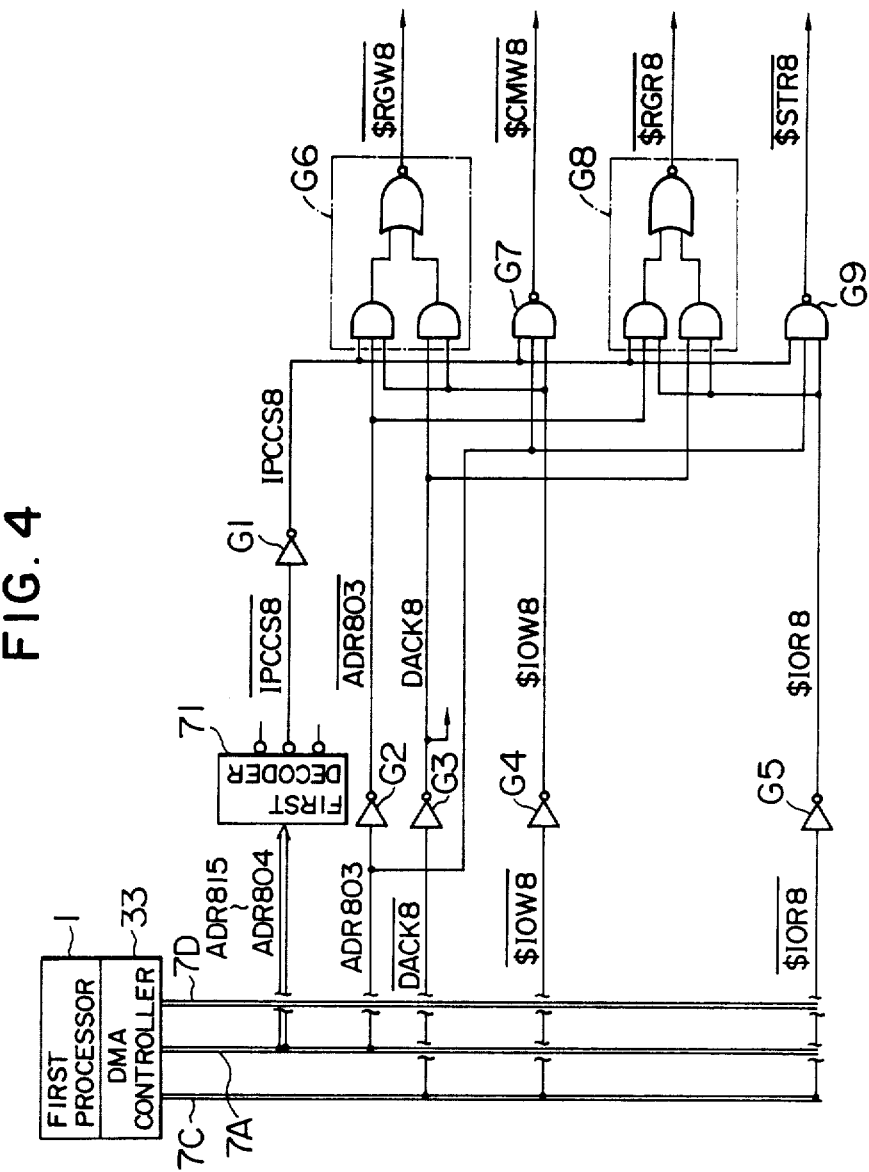
Figure 7:
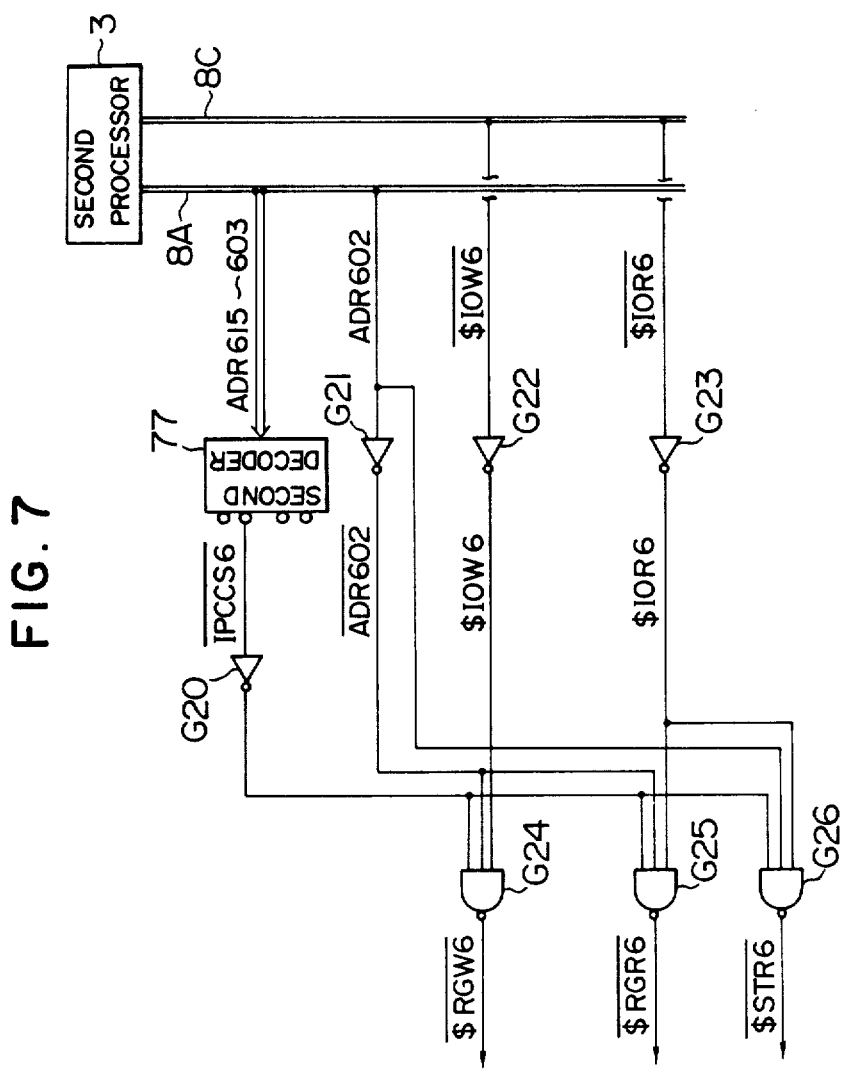

The data buffers shown in FIGS. 1 and 2 have detailed configuration as shown in FIG. 3. Data transfer from the first processor 1 to the first data buffer 39 is effected via a data bus 7D and data lines of 8 bits labelled DAT 80 to 87. Data transfer from the first data buffer 39 to the second processor 3 is effected via data lines of 8 bits labelled DAT 60 to 67 and a data bus 8D. Lower two bits of address data from the first processor 1 are fed to write address terminals WA1 and WA0 of the first data buffer 39 via an address bus 7A and address lines labelled ADR 801 and 800, and also fed to read address terminals RA1' and RA0' of the second data buffer 40 via the address bus 7A and address lines labelled ADR 801' and 800'. Lower two bits of address data from the second processor 3 are fed to read address terminals RA1 and RA0 via an address bus 8A and address lines labelled ADR 601 and 600, and are also fed to write address terminals WA1' and WA0' of the second data buffer 40 via the address bus 8A and the address lines labelled ADR 601' and 600'. A buffer write strobe signal $RGW8 which will be described in detail in FIG. 4 is fed to a write enable terminal WE of the first data buffer 39. A buffer read strobe signal $RGR6 which will be described in detail in FIG. 7 is fed to a read enable terminal RE of the first data buffer 39. A buffer read strobe signal $RGR8 which will be described in detail in FIG. 4 is fed to a read enable terminal RE' of the second data buffer 40. Further, a buffer write strobe signal $RGW6 which will be described in detail in FIG. 7 is fed to a write enable terminal WE' of the second data buffer 40.

FIG. 4 shows a detailed configuration of a circuit for creating a read strobe signal and a write strobe signal in accordance with an address signal and a control signal from the processor 1. The circuit shown in FIG. 4 corresponds to the first write strobe circuit 51 and the second read strobe circuit 56 shown in FIG. 2. A first decoder 71 is provided for decoding an address signal fed from the first processor 1 via address lines of 12 bits labelled ADR 804 to 815, thereby to create an IPC port address select signal $\overline{IPCCS8}$. Inverters G1 to G5 are provided for inverting phases of the signal $\overline{IPCCS8}$, a signal on ADR 803, a DMA acknowledge signal $\overline{DACK8}$, a write strobe signal $IOW8 and a read strobe signal $IOR8. A signal DACK8 output from the inverter G3 is fed to a mode storage circuit which will be described in FIG. 5. An AND-NOR gate G6 is provided for producing buffer write strobe signal $\overline{RGW8}$ fed to the first data buffer 39 shown in FIG. 3 and a circuit to be described later with reference to FIG. 6. A NAND gate G7 is provided for creating a command write strobe signal $CMW8 fed to a circuit shown in FIG. 5 which will be described later. An AND-NOR gate G8 is provided for creating a read strobe signal $RGR8 fed to the second data buffer shown in FIG. 3 and a circuit shown in FIG. 9 which will be described later. A NAND gate G9 is provided for creating an interrupt status read strobe signal $\overline{STR8}$ fed to a circuit shown in FIG. 5 which will be described later.

Figure 5:
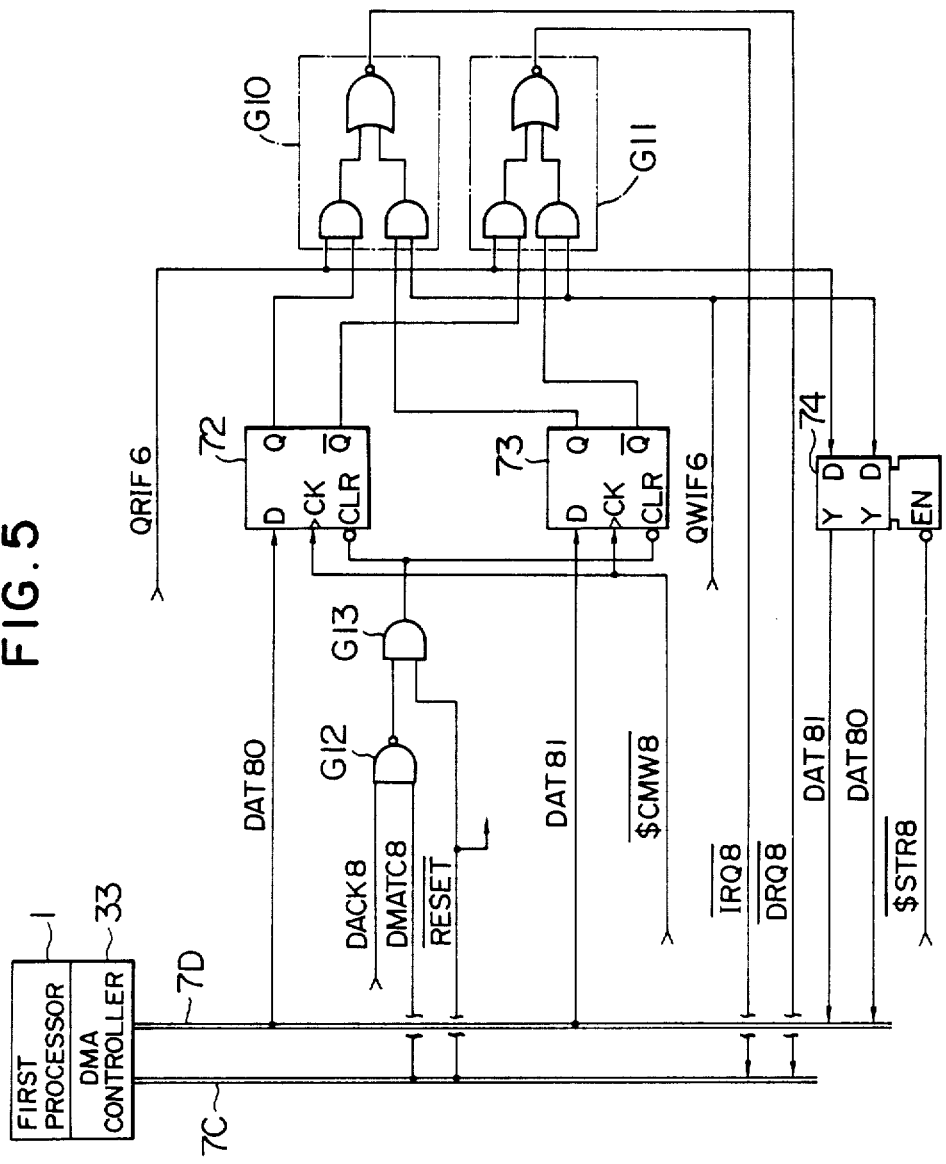

FIG. 5 shows a detailed configuration of a circuit for creating a DMA request signal and an interrupt request signal. The circuit shown in FIG. 5 corresponds to the first and second mode storage circuits 62 and 63 and the first and second selectors 64 and 65 shown in FIG. 2. A D-type flip-flop (F/F) 72 is provided for setting a control mode of data transfer (data write) into the first data buffer 39 to DMA or interrupt. A D-type F/F 73 is provided for setting a control mode of data transfer (data read) from the second data buffer 40 to DMA or interrupt. A tristate driver 74 is operative to output an interrupt status read strobe signal $\overline{STR8}$ fed from the NAND gate G9 shown in FIG. 4 on data lines labelled DAT 81 and 80. An AND-NOR gate G10 is provided for creating a DMA request signal DRQ8. An AND-NOR gate G11 is provided for creating an interrupt request signal $\overline{IRQ8}$. It is to be noted that a DMA acknowledge signal DACK8 is fed from the inverter G3 shown in FIG. 4, a command write strobe signal $CMW8 is fed from the NAND gate shown in FIG. 4 and interrupt request status signals QRIF6 and QWIF6 are fed from a circuit shown in FIG. 8 which will be described later.

Figure 6:
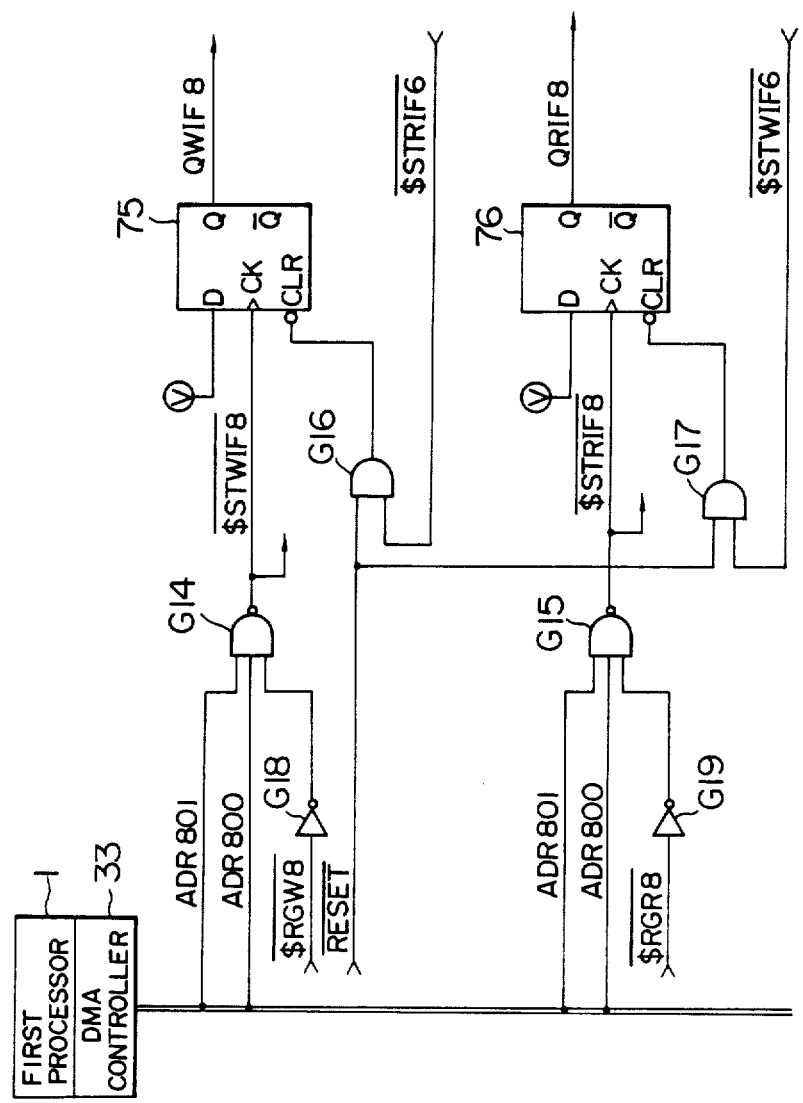

FIG. 6 shows a detailed configuration of a circuit for creating an interrupt request status signal. The circuit shown in FIG. 6 corresponds to the first read request circuit 53 and the second write request circuit 61 shown in FIG. 2. A NAND gate G14 is provided for creating a strobe signal $STWIF8. A NAND gate G15 is provided for creating a strobe signal $STRIF8 . Further, a D-type F/F 75 is provided for requesting the second processor 3 to pick up transfer data in the first data buffer 39 to deliver an interrupt request status signal QWIF8 to a circuit shown in FIG. 8 which will be described later. A D-type F/F 76 is provided for requesting the second processor 3 to write the subsequent transfer data when read operation of the transfer data in the second data buffer 40 is completed to deliver an interrupt request status signal QRIF8 to a circuit shown in FIG. 8 which will be described later.

Further, a reset signal $\overline{RESET}$ commonly input to AND gates G16 and G17 is supplied via the control bus 7C shown in FIG. 5. Strobe signals $\overline{\$STRIF6}$ and $\overline{\$STWIF6}$ input to the respective AND gates G16 and G17 are respectively supplied from circuits shown in FIG. 8 which will be described later. A buffer write strobe signal $\overline{\$RGW8}$ input to an inverter G18 is delivered from the AND-NOR gate G6 shown in FIG. 4. A buffer read strobe signal $\overline{\$RGR8}$ input to an inverter G19 is delivered from the AND-NOR gate G8 shown in FIG. 4. In addition, strobe signals $\overline{\$STWIF8}$ and $\overline{\$STRIF8}$ output from the NAND gates G14 and G15 are also supplied to a circuit shown in FIG. 8 which will be described later.

FIG. 7 is a detailed configuration of a circuit for creating a write strobe signal and a read strobe signal in accordance with address and control signals from the second processor 3. The circuit shown in FIG. 7 corresponds to the first read strobe circuit 55 and the second write strobe circuit 52. A second decoder 77 is provided for decoding each address signal delivered from the second processor 3 via ADR 603 to 615 to create an IPC port address select signal Inverters G20 to G23 are provided for inverting phases of the signal $\overline{IPCCS6}$, a signal on an address line ADR 602, the write strobe signal $\overline{\$IOW6}$ and the read strobe signal $\overline{\$IOR6}$, respectively. A NAND circuit G24 is provided for creating a buffer write strobe signal $\overline{\$RGW6}$ to the second data buffer 40 shown in FIG. 3. A NAND circuit G25 is provided for creating a buffer write strobe signal $\overline{\$RG16}$ to the first data buffer 39 shown in FIG. 3. A NAND circuit G26 is provided for creating an interrupt status read strobe signal $\overline{\$STR6}$ fed to a circuit shown in FIG. 8 which will be described later.

Figure 8:
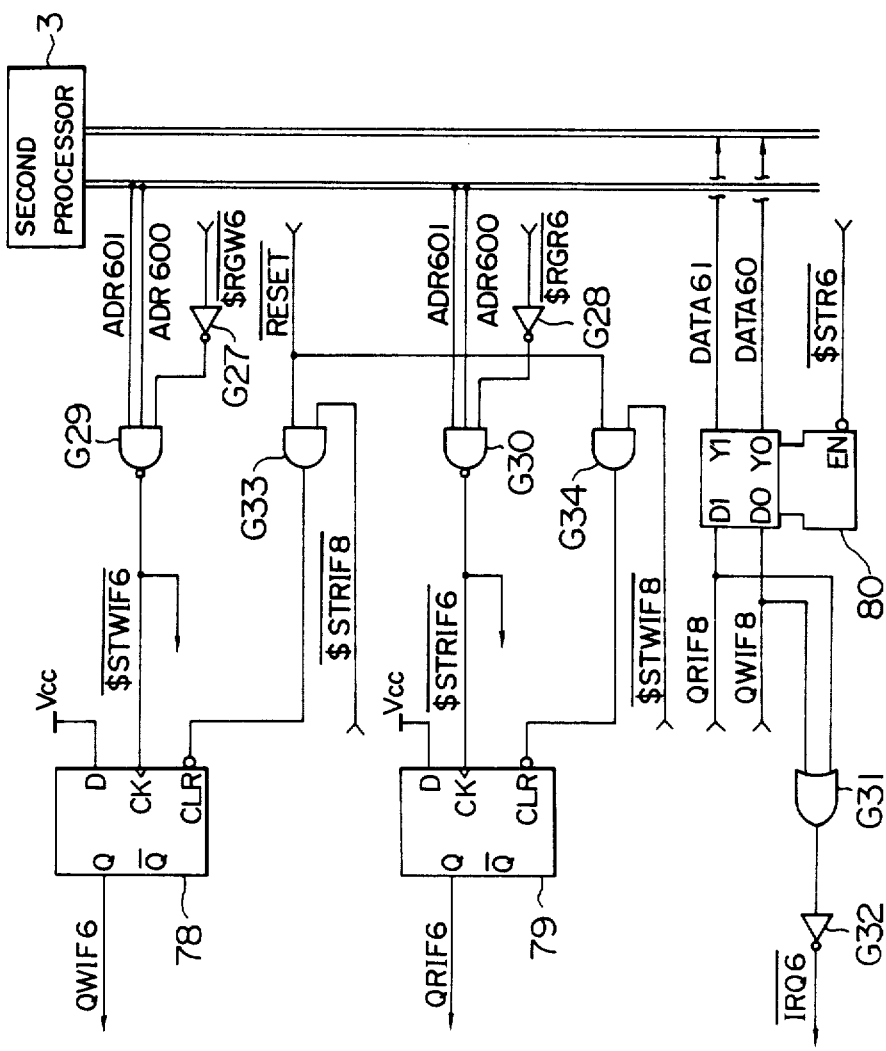

FIG. 8 shows a detailed configuration of an interface circuit for creating an interrupt request status signal to the first processor 1 and an interface circuit for a circuit for creating an interrupt request status signal to the second processor 2. The circuit shown in FIG. 8 corresponds to the first write request circuit 57 and the second read request circuit 54, etc. shown in FIG. 2. A D-type F/F 78 is provided for requesting the first processor 1 to pick up transfer data in the second data buffer 40 to create an interrupt request status signal QWIF6, thus delivering it to the AND-NOR gates G10 and G11 and the driver 74 shown in FIG. 5. A D-type F/F 79 is provided for requesting the first processor 1 to write the subsequent transfer data when read operation of the transfer data in the first data buffer 39 is completed to create an interrupt request status signal QRIF6 to deliver it to the AND-NOR gates G10 and G11 and the driver 74 shown in FIG. 5. A driver 80 is operative to input signals QRIF8 and QWIF8 of interrupt request status signals output from the F/F 75 and 76 shown in FIG. 6 and to input the strobe signal $\overline{\$STR6}$ output from the NAND gate G26 shown in FIG. 7 to output an interrupt request status signal on DAT 61 and 60.

Inverters G27 and G28 are provided for inverting the buffer write strobe signal $\overline{\$RGW6}$ and the buffer read strobe signal $\overline{\$RGR6}$ output from the NAND gates G24 and G25 shown in FIG. 7, respectively. NAND gates G29 and G30 are provided for creating strobe signals $\overline{\$STWIF6}$ and $\overline{\$STRIF6}$, respectively. An OR gate G31 is provided for creating an interrupt request signal IRQ6 in accordance with the interrupt request status signals QRIF8 and QWIF8 output from the F/F 75 and 76 shown in FIG. 6. The interrupt request signal IRQ6 is phaseinverted by an inverter G32 of an open collector type. It is to be noted that the reset signal $\overline{RESET}$ commonly input to AND gates G33 and G34 are supplied from the first processor 1 as shown in FIG. 5, and strobe signals $\overline{\$STRIF8}$ and $\overline{\$STWIF8}$ input to the respective AND gates G33 and G34 are supplied from the NAND gates G14 and G15 shown in FIG. 6, respectively. The strobe signals $\overline{\$STWIF6}$ and $\overline{\$STRIF6}$ output from NAND gates G29 and G30 are supplied to AND gates G16 and G17 shown in FIG. 6, respectively.

Then, the operation of the embodiment shown in FIGS. 2 to 8 will be described with reference to FIGS. 9 and 10. The procedure for transferring data from the first processor to the second processor 3 through the first data buffer 39 is executed in accordance with the following sequence.

(1) Sending of a transfer start (START) command (on the side of the first processor).

(2) Reading of the START command (on the side of the second processor).

(3) Setting of a DMA mode (on the side of the first processor).

(4) Sending of transfer data based on the DMA mode (on the side of the first processor).

(5) Reading of the transfer data based on an interrupt mode (on the side of the second processor).

(6) Sending and reading of a transfer end (END) command.

Figure 9:
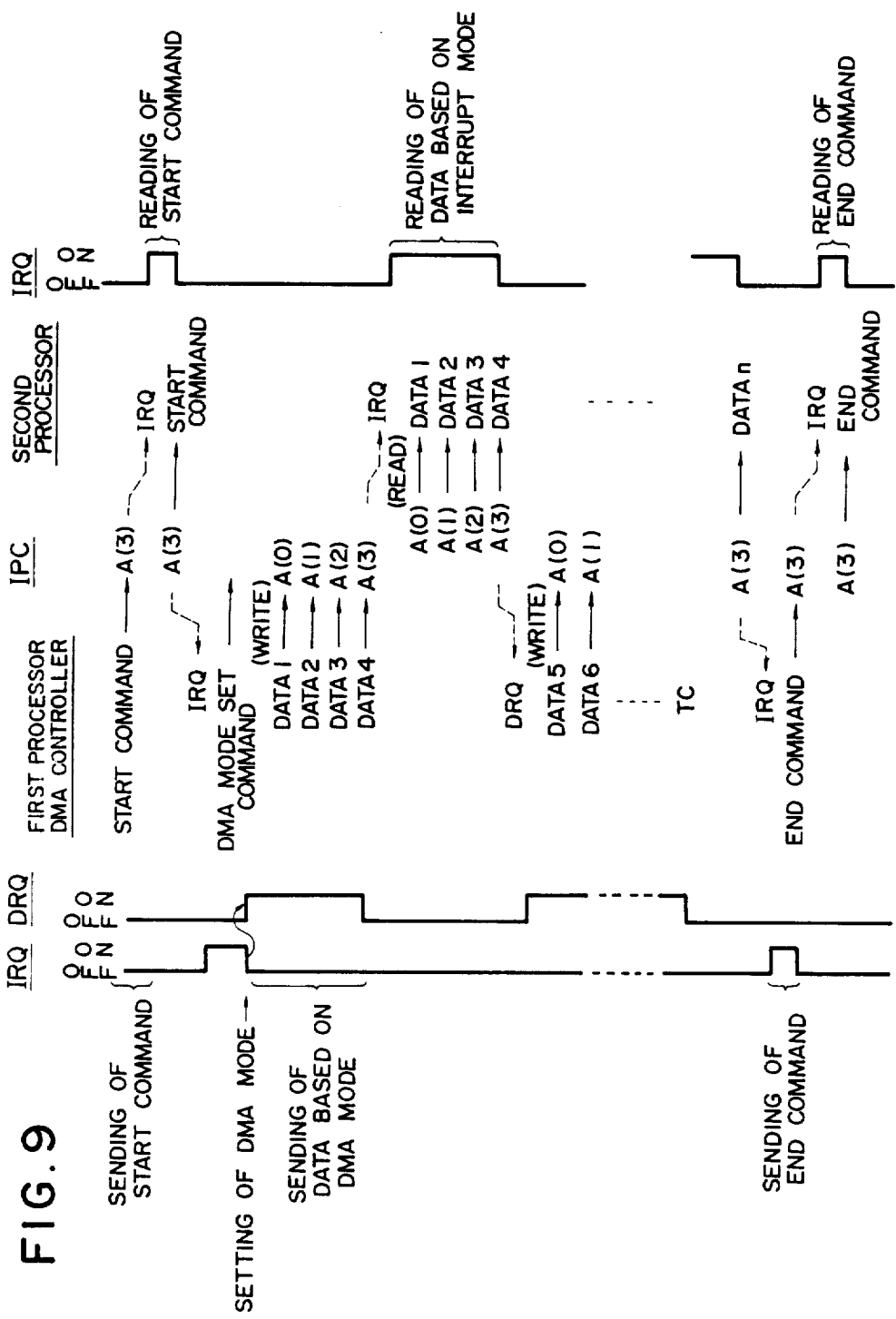
FIGS. 9 and 10 are explanatory views for the operation of the embodiment shown in FIGS. 2 to 8.

FIG. 9 is an explanatory view for data transfer effected through the first data buffer 39. The operation will be described in accordance with the above-mentioned sequence.

(1) Sending of START command

The first processor 1 becomes operative to designate an I/O port address of the first data buffer 39 by making use of ADR 803 to 815 and to designate the third address A(3) of the first data buffer 39 by making use of ADR 800 and 801, thereby to output a START command and the write strobe signal $\overline{\$IOW8}$ on DAT 80 to 87. Each signal on the address lines corresponding to the upper 12 bits labelled ADR 804 to 815 is input to the decoder 71 shown in FIG. 4 to create the IPC select signal The phase-inverted IPC select signal IPCCS8 is input to the AND-NOR gate G6 shown in FIG. 4 together with a phase-inverted signal on ADR 803 and the write strobe signal $\overline{\$IOW8}$ to create the buffer write strobe signal $\overline{\$RGW8}$ therein.

Subsequently, as shown in FIG. 9, the START command is written into a memory area assigned to A(3) of the first data buffer 39 in accordance with the buffer write strobe signal $\overline{\$RGW8}$ and at the same time the strobe signal $\overline{\$TWIF8}$ is output from the NAND gate G14 to set the F/F 75 (a signal level of a Q output labelled QWIF8 becomes high) for requesting the second processor to pick up an interrupt request.

(2) Reading of START command

When the second processor 3 accepts the interrupt request from the F/F 75, it becomes operative to output an I/O port address of the first data buffer 39 on each address line ADR 602 to 615, and an internal address (the third address and a read strobe signal On the address lines ADR 600 and 601. Each signal on the address lines ADR 603 to 615 of the upper 13 bits is input to the second decoder 77 shown in FIG. 7 to create the IPC select signal $\overline{IPCCS6}$ therein. The phase-inverted IPC select signal IPCCS6 is input to the NAND gate G25 shown in FIG. 7 together with a phase-inverted signal on ADR 602 and the read strobe signal $\overline{SIOR6}$ to create a buffer read strobe signal $\overline{SRGR6}$ therein.

Then, as shown in FIG. 9, the START command in the first data buffer 39 is read by the second processor 3 in accordance with the buffer read strobe signal $\overline{SRGR6}$, and at the same time the strobe signal $SSTRIF6$ is output from the NAND gate G30 shown in FIG. 8 to set the F/F 79. When the F/F 79 is set, its Q output QRIF6 shifts to high level (which will be called "H" hereinafter). As a result, the interrupt request signal $\overline{IRQ8}$ is output from the AND-NOR gate G11, thus requesting the first processor 1 to start data transfer as shown in FIG. 9.

(3) Setting of DMA mode

When the first processor 1 accepts the interrupt request for starting data transfer, it allows the F/F 72 shown in FIG. 5 to be set in accordance with a DMA mode set command as shown in FIG. 9. When the F/F 72 is set, the interrupt request signal $\overline{IRQ8}$ is switched to the DMA request signal $\overline{DRQ8}$.

The first processor 1 becomes operative to designate an I/O port address of the F/F 72 by making use of the address lines corresponding to 13 bits labelled ADR 803 to 815 to allow a signal level on the data line 80 to become "H", thus to output the write strobe signal $SIOW8$. Thus, the NAND gate G7 shown in FIG. 4 becomes operative to create a command write strobe signal $\overline{SCMW8}$. Because the data line DAT 80 is placed in "H" level when the command strobe signal $\overline{SCMW8}$ rises, the F/F 72 shown in FIG. 5 is set. As a result, the Q output shifts to "H" level and the $\overline{Q}$ output shifts to low level (which will be called "L"). The DMA mode is thus set.

(4) Sending of transfer data based on DMA mode

When the DMA controller 33 detects the DMA request signal DRQ8 from the IPC 38, it becomes operative to request the first processor 1 to be placed in wait, i.e., hold condition. As a result, the control of the buses 7A, 7C and 7D on the side of the first processor 1 shifts from the first processor 1 to the DMA controller 33.

The DMA controller 33 becomes operative to read transfer data DATA 1 from the first processor 1 to the second processor 3 out of the memory 31 to output it on the DAT 80 to 87. Then, the DMA controller 33 becomes operative to output the acknowledge signal DACK8 and a write strobe signal $SIOW8$ to deliver them to the AND-NOR gate G6 shown in FIG. 4. Thus, the buffer write strobe signal $SRGW8$ output from the AND-NOR gate G6 is input to a write enable terminal WE of the first data buffer 39 shown in FIG. 3.

When the buffer write strobe signal $SRGW8$ shifts to "L", the first data buffer 39 shown in FIG. 3 becomes operative to write the DATA 1 on the DAT 80 to 87 into a memory area assigned to A(0) by making use of the two address lines ADR 800 and 801 corresponding to the lower two bits in a manner shown in FIG. 9. Likewise, under the control of the DMA controller 33 the subsequent DATA 2 to 4 are read from the memory 31 and written into memory areas assigned to A(1) to A(3) by making use of ADR 800 and 801, respectively.

When writing the DATA 4 into the memory area A(3), both ADR 800 and 801 shift to "H". Accordingly, the strobe signal.$\overline{SSTWIF8}$ is output from the NAND gate G14 shown in FIG. 6. In synchronism with the rising of the strobe signal $\overline{SSTWIF8}$, the F/F 75 shown in FIG. 6 is set. As a result, its Q output (QWIF8) shifts to "H". The Q output of high level is fed to the OR gate 31 shown in FIG. 8. Thus, the interrupt request signal $\overline{IRQ6}$ shifts to "L", thereby requesting the second processor 3 to pick up the DATA 1 to 4 as shown in FIG. 8.

The output $\overline{IRQ6}$ of the gate G32 of the open collector type and each of other interrupt request signals are wired-OR. The wired-OR output is used as an interrupt request signal which will be sent to the second processor 3. The second processor 3 can read the Q output QWIF8 of the F/F 75 shown in FIG. 6 through the driver 80 shown in FIG. 8 to check the causes of interrupts. On the other hand, because the strobe signal $\overline{SSTWIF8}$ is input to a clear terminal CLR of the F/F 79 through the AND gate G34, the F/F 79 is reset when the DATA 4 is written into the memory area A(3), thus shifting the Q output QRIF6 to "L". For this reason, the DMA request signal $\overline{RQ8}$ from the AND-NOR gate G10 shown in FIG. 5 shifts to "H". The write operation of the transfer data is interrupted until the contents of the first data buffer 39 become empty.

(5) Reading of transfer data based on interrupt mode

When the second processor 3 accepts an interrupt request, it starts to effect read operation of the transfer data.

The second processor 3 becomes operative to output an I/O port address of the first data buffer 39 on ADR 602 to 615 and to output the zero address of an internal address of the first data buffer on ADR 600 and 601 to output a read strobe signal $\overline{SIOR6}$. Signals on ADR 603 to 615 corresponding to the upper 3 bits are input to the decoder 77 shown in FIG. 7 to create the IPC select signal $\overline{IPCCS6}$ therein. The IPC select signal $\overline{IPCCS6}$ is input to the NAND gate G25 shown in FIG. 7 together with a signal on ADR 602 and the read strobe signal $\overline{SIOR6}$ to create the buffer read strobe signal $\overline{SRGR6}$ therein.

The buffer read strobe signal $SRGR6$ is input to a read enable terminal RE of the first data buffer 39 shown in FIG. 3. When the buffer read strobe signal $SRGR6$ shifts to "L", the first data buffer 39 becomes operative to output the DATA held in A(0) on DAT 60 to 67 in accordance with addresses input through ADR 600 and 601. On the other hand, the second processor 3 becomes operative to read the DATA on DAT 60 to 67 in synchronism with the rising of the buffer read strobe signal $\overline{SRGR6}$, i.e., the rising of the read strobe signal $\overline{SIOR6}$ as shown in FIG. 9. Likewise, the second processor becomes operative to designate A(1) to A(3) by making use of address lines ADR 600 and 601 corresponding to the upper two bits to successively read DATA 2 to 4.

When the DATA is read out of A(3), both ADR 600 and 601 are placed in "H" so that the strobe signal $SSTRIF6$ is output from the NAND gate G30 shown in FIG. 8. For this reason, the F/F 79 is set when the strobe signal $\overline{SSTRIF6}$ rises. As a result, its Q output QRIF6 shifts to "H", thus shifting the DMA request signal from the AND-NOR gate G10 shown in FIG. 5 to "L". Thereby, it is indicated to the DMA controller 33 that the read operation of DATA 1 to 4 from the first data buffer 39 has been completed, and at the same time the first processor 1 is requested to write the subsequent transfer data (DATA 5 and data subsequent thereto).

On the other hand, because the strobe signal $\overline{SSTRIF6}$ is input to a CLR terminal of the F/F 75 through the AND gate G16 shown in FIG. 6, the F/F 75 for interrupt request is reset simultaneously with the read operation of the transfer data from A(3).

By repeatedly carrying out the similar procedure, DATA 5 to n will be transferred from the first processor 1 to the second processor 3.

(6) Sending and reading of an END command

When the DATA n which is the final transfer data to the second processor 3 is written into the first data buffer 39, the DMA controller 33 becomes operative to output the write strobe signal $\overline{SIOW8}$ and the DMA acknowledge signal $\overline{DACK8}$ and to output the DMA terminal count signal DMATC8. The signal DMATC8 is input to a clear terminal CLR of the F/F 72 through the NAND gate G12 and the AND gate G13 shown in FIG. 5. Thus, when the signal DMATC8 is output, the F/F 72 is reset to switch the write mode to the first data buffer 39 from the DMA mode to the interrupt mode. When the DATA n which is the final transfer data is read out of the first data buffer 39 by the second processor 3, the F/F 79 shown in FIG. 8 is set to output an interrupt request signal $\overline{IRQ8}$ from the AND-NOR gate G11 shown in FIG. 5.

When the interrupt request signal $\overline{IRQ8}$ is given, the first processor detects that the data are transferred to the second processor 1 to write the END command into A(3) of the first data buffer 39. When the second processor 3 has read the END command, the data transfer sequence is completed.

Figure 10:
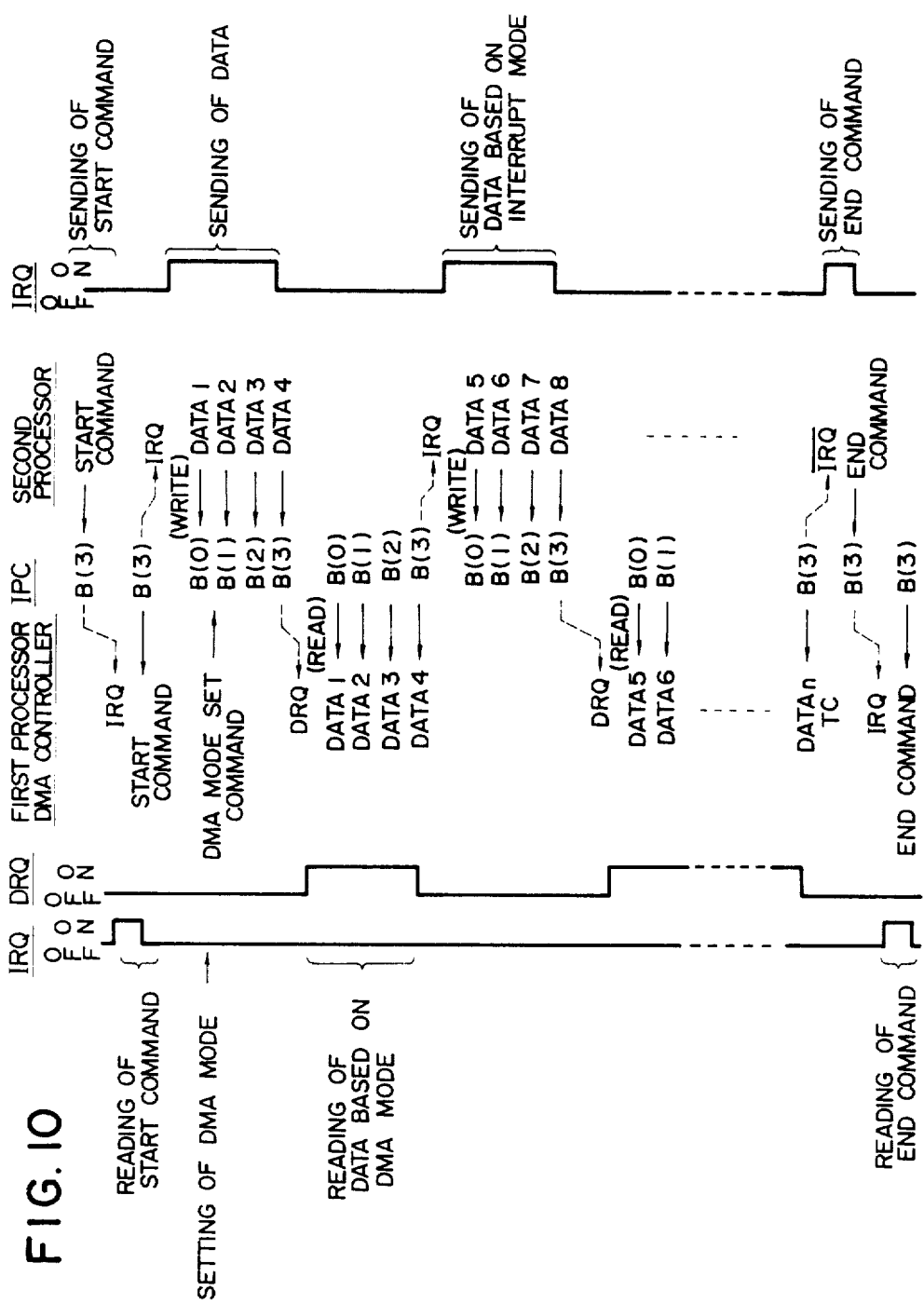

FIG. 10 is an explanatory view for data transfer effected through the second data buffer 40. The data transfer in this case is carried out in accordance with a sequence similar to the sequence which has been described with reference to FIG. 9.

First, at a START command sending stage, the second processor 3 becomes operative to send a START command to write it into the memory area assigned to B(3) of the second data buffer 40. In addition, an interrupt request signal IRQ is sent from the IPC 38 to the first processor 1.

Then, at a START command reading stage, the START command which is written into the memory area assigned to B(3) of the second buffer 40 is read by the first processor 1. In addition, the interrupt request signal IRQ is sent from the IPC 38 to the second processor 3.

Then, at a DMA mode setting stage, the first processor 1 becomes operative to send a DMA mode set command to store the DMA mode into the second mode storage circuit shown in FIG. 2. At this time, because the second processor 3 has already acknowledged receipt of the interrupt request signal IRQ, DATA 1 to 4 are written into memory areas assigned to B(0) to B(3) of the second data buffer 40 in succession.

When the writing operation of the transfer data into B(3), which has been initiated from B(0), is completed, the DMA request signal DRQ is sent to the first processor 1 to start read operation of the DATA 1 to 4 from the second data buffer 40 to the first processor 1 at the DMA mode.

In a manner similar to the above, DATA 5 to n will be transferred from the second processor 3 to the first processor 1. Upon completion of entire data transfer, the END command from the second processor 3 is written into B(3) of the second data buffer 40. Further, the END command thus written is read by the first processor 1, thus completing the data transfer sequence.

In the above-mentioned embodiment, it has been described that the DMA controller 33 is provided on the side of the first processor. However, the present invention is not limited to this embodiment. For instance, by additionally providing another DMA controller on the side of the second processor 3, it is possible to control data transfer between processors by making use of respective DMA controllers in both the microprocessor systems. Further, present invention is applicable to the case where in general the first data buffer 39 have N bytes (N is a positive integer) and the second data buffer 40 have M bytes (M is a positive integer). Furthermore, the present invention is applicable to the case where each processor has the internal architecture of an arbitrary number of bits, e.g., 4 bits or 32 bits, etc.

In addition, the data buffer may be configured with TTL IC. Such a configuration makes it possible to reduce the number of peripheral logic circuits, thus easily providing a gate array and/or LSI circuit configuration.

What is claimed is:
1. A multiprocessor system comprising:
 (a) a plurality of processor, none of which are controlled by others of said plurality of processors;
 (b) at least one data buffer means through which transfer data is transferred between the processors, and into which transfer data can be written, and from which transfer data can be read;
 (c) mode storage means whose contents are rewritten by at least one of said plurality of processors, said mode storage means storing mode information indicating whether a write operation of transfer data from said at least one processor into said data buffer means and/or a read operation of transfer data from said data buffer means to said at least one processor are/is controlled by a DMA process or by an interrupt process;
 (d) condition storage means for storing information indicating that said data buffer means is in a condition permitting said at least one processor to write data thereinto and/or information indicating that said data buffer means is in a condition permitting said at least one processor to read data therefrom;
 (e) selector means operative to output either a DMA request signal or an interrupt request signal based on contents of said mode storage means and said conditions storage means; and
 (f) at least one DMA controller operative to control said write operation of said transfer data from said at least one processor into said data buffer means and/or said read operation of said transfer data from said data buffer means to said at least one processor by the DMA process, when said DMA request signal is given,
 said at least one processor being operative to control said write operation of transfer data into said data buffer means and/or said read operation of transfer data from said data buffer means by the interrupt process, when said interrupt request signal is given.

2. A multiprocessor system as set forth in claim 1, wherein (a) said plurality of processors includes a pair of processors, (b) said data buffer means includes a first buffer for transferring data from one of said pair of processors to the other and a second buffer for transferring data from the other processor to said one processor, and (c) said 'mode storage means includes a first mode memory whose contents are rewritten by said one processor and for storing mode information indicating whether write operation of transfer data from said one processor into said first buffer is controlled by the DMA process or by the interrupt process, and a second mode memory whose contents are rewritten by said one processor and for storing mode information indicating whether read operation of transfer data from said first buffer to said one processor is controlled by the DMA process or by the interrupt process.

3. A multiprocessor system as set forth in claim 2, wherein said condition storage means includes (a) a first read request circuit which operates to store information indicating that said first buffer is in a read allowed condition to request said the other processor to read transfer data out of said first buffer, when said one processor writes transfer data into said first buffer, (b) a first write request circuit which operates to store information indicating that said first buffer is in a write allowed condition to request said one processor to write transfer data into said first buffer, when said the other processor reads transfer data out of said first buffer, (c) a second read request circuit which operates to store information indicating that said second buffer is in a read allowed condition to request said one processor to read transfer data out of said second buffer, when said the other processor writes transfer data into said second buffer, and (d) a second write request circuit which operates to store information indicating that said second buffer is in a write allowed condition to request said the other processor to write transfer data into said second buffer, when said one processor reads transfer data out of said second buffer.

4. A multiprocessor system as set forth in claim 3, wherein said selector means includes (a) a first selector wherein when said first mode memory is operative to store the information of a DMA mode therein and when said first write request circuit is operative to send a write request to said first selector, said first selector is operative to output a DMA request signal toward said one processor, and when said first mode memory is operative to store information of an interrupt mode therein and when said first write request circuit is operative to send a write request to said first selector, said first selector is operative to output an interrupt request signal toward said one processor, and (b) a second selector wherein when said second mode memory is operative to store the information of the DMA mode and when said second read request circuit is operative to send a read request to said second selector, said second selector is operative to output a DMA request signal toward said one processor, and when said second mode memory is operative to store the information of the interrupt mode therein and when aid second read request circuit is operative to send a read request to said second selector, said second selector is operative to output an interrupt request signal toward said one processor, whereby said DMA controller effects a write control of transfer data from said one processor into said first buffer and a read control of transfer data from said second buffer to said one processor by the DMA process.

5. In a control method for a multiprocessor system operative to effect a bidirectional data transfer among a plurality of processors, none of which are controlled by others of said plurality of processors, through data buffer means of a plurality of bytes permitting transfer data to be written thereinto and to be read therefrom the improvement wherein the method comprises:
  (a) a first step of judging whether or not said data buffer means is in a condition permitting one processor among said plurality of processors to transfer data from or into the data buffer means;
  (b) a second step of sending an instruction for effecting a write operation from said one processor to said data buffer and/or a read operation from said data buffer means to said one processor by a DMA process or an interrupt process;
  (c) a third step of effecting the write operation of the transfer data into said data buffer means by said one processor and or the read operation of the transfer data from said data buffer means by said one processor by the DMA process, when the result of the judgement indicates the condition permitting said one processor transfer from or into said data buffer means and when the instruction for effecting the control by said DMA process is sent in said second step; and
  (d) a fourth step of effecting the write operation of the transfer data into said data buffer means by said one processor and/or the read operation of the transfer data from said data buffer means by said one processor by the interrupt process, when the result of the judgment indicates the condition permitting said one processor to transfer from or into said data buffer means and when the instruction for effecting the control by said interrupt control is sent in said second step.

* * * * *